United States Patent [19]

Schluchter et al.

[11] 4,426,163

[45] Jan. 17, 1984

[54] BEARING SUPPORT ARRANGEMENT FOR ELECTRICAL MACHINES

[75] Inventors: Martin Schluchter, Birr; Max Voser, Scherz, both of Switzerland

[73] Assignee: BBC Brown, Boveri & Company, Limited, Baden, Switzerland

[21] Appl. No.: 343,244

[22] Filed: Jan. 27, 1982

[30] Foreign Application Priority Data

Jan. 29, 1981 [CH] Switzerland ................ 587/81

[51] Int. Cl.³ .................................. F16C 35/02
[52] U.S. Cl. ........................ 384/428; 384/438; 384/444; 310/90; 310/91
[58] Field of Search ............ 308/189 R, 207 R, 178, 308/186; 310/90, 91; 384/252, 256, 257, 428, 438, 439, 440, 441, 442, 443, 444, 215, 418; 248/49, 55

[56] References Cited

U.S. PATENT DOCUMENTS

| | | | |
|---|---|---|---|
| 2,012,844 | 8/1935 | Wood | 384/438 |
| 2,210,705 | 8/1940 | Brown | 308/189 R |
| 2,524,693 | 10/1950 | Bryant | 384/215 |
| 3,375,382 | 3/1968 | Barber et al. | 310/90 |
| 3,395,594 | 8/1968 | Blair | 310/91 X |

*Primary Examiner*—Stuart S. Levy
*Assistant Examiner*—Thomas R. Hannon
*Attorney, Agent, or Firm*—Oblon, Fisher, Spivak, McClelland & Maier

[57] ABSTRACT

A bearing support arrangement for electrical machines is made double-walled and box-like and has, between the two walls, reinforcements and supports for the bearings, the bearing support arrangement extending approximately up to the axial center plane of the bearings. The bearing support arrangement can be made in one part or in several parts, that is to say it can, at least on one side of the machine, be subdivided horizontally into two supporting bodies, or the lower supporting body and the upper supporting body, respectively, can likewise be subdivided in a vertical direction.

8 Claims, 4 Drawing Figures

BEARING SUPPORT ARRANGEMENT FOR ELECTRICAL MACHINES

BACKGROUND OF THE INVENTION

1. Field of the Invention

The present invention relates to an electrical machine of horizontal design with a housing and with a bearing support arrangement, with integrated bearings, which is releasably connected to the end faces of the housing, the bearing support arrangement being made double-walled and box-like with reinforcing ribs located between the two walls, and supports being provided for receiving the bearings.

2. Description of the Prior Art

A bearing support of this type has already been proposed, for example, in Swiss Patent Application No. 10,331/79-7, or German Patent Application No. P 2,950 570. This is intended for large turbo-generators and is therefore correspondingly expensive.

In a bearing support known in the art, the stator of an electrical machine is located on a frame-like supporting cradle, this cradle being fastened on a base-frame. The supports for the rotor are located in cross-struts of the cradle and can be adjusted and fixed by means of special adjusting elements. The entire frame-like construction of the cradle is covered with removable casing panels, these panels forming, at the same time, housing parts and cooling-air guides (U.S. Pat. No. 3,064,152).

Since, in this design of a bearing support, the cradle, receiving the stator, and the housing parts holding the bearings are mounted on a common base-frame, all the out-of-balance forces caused by the rotor are transmitted into the foundation via the stator housing parts. A further disadvantage of a bearing arrangement of this type is the relatively great anisotropy of the rotor mounting, that is to say different elasticities of the bearing support in the horizontal and the vertical direction, this leading to a lower critical speed for flexural distortion and to an increased speed range in which resonant vibrations can occur.

SUMMARY OF THE INVENTION

The object of the present invention is, therefore, to provide a bearing support arrangement in which the above-mentioned disadvantages are avoided and in which a horizontal and a vertical stiffening of the bearing is achieved by connecting the bearing block and the machine housing and connecting this unit to the foundation, this stiffening representing an optimum for average electrical machines (up to approximately 20 MW).

The above-mentioned object is achieved, according to the invention, due to the fact that the bearing support arrangement extends approximately up to the axial center plane of the bearings, and the upper half of the end faces of the housing is closed by covers extending down to the top side of the bearing support arrangement.

The advantage of the design according to the invention is to be seen especially in the fact that the bearing support arrangement made double-walled and box-like in a known manner can be exactly positioned when the rotor is introduced into the stator, and can be screwed to the machine housing. The bearing support arrangement and the machine housing each have a standing surface, and these can be machined together, as a result of which a base-plate is no longer required.

The development of the invention according to one aspect of the present invention offers the advantage that dismantling of the electrical machine is substantially simplified, specifically by pulling out the lower supporting body axially and laterally and lowering the upper supporting body.

Further advantageous designs according to which, respectively, the lower and the upper supporting bodies are sub-divided in a vertical plane, will prove advantageous wherever confined space conditions prevail in the axial direction or on both sides of the machine at the place of erection of the machine. Thus, in these embodiments, after the bearing support arrangement has been released from the machine housing, the two supporting body parts of the lower supporting body or of the upper supporting body, respectively, can be removed laterally, as a result of which the rotor shaft is freed and the rotor can be drawn out from the machine housing. Assembly can also be carried out in a similar manner to this, and because of the sub-division of the supporting bodies expensive auxiliary supports no longer become necessary, since assembly can be effected in the form of a modular system.

By providing, according to the invention, assembly orifices in the supporting bodies, the assembly of the machine is further simplified, and no special tools of any kind become necessary.

In accordance with another aspect of this invention, an oil sump can be provided underneath the bearings. As a result, expensive lubricating-oil lines, complicated to lay, are avoided, especially in the case of self-cooling by applying lubricant to the bearings.

Another aspect of the invention, according to which the horizontal parting place of the two bearing bodies is located on a level with the lower edge of the rotor or above this, affords the advantage that, for example, when an inspection of the machine becomes necessary, only the upper supporting bodies need to be detached from the machine housing and the upper supporting body from the lower supporting body, after which the rotor together with the bearing and the upper supporting body of one side of the machine can be drawn out from the stator, while the lower supporting body can remain screwed to the foundation. On the other side of the machine, only the bearing needs to be dismantled.

A preferred possibility of dismantling involves detaching, on one side of the machine, the lower supporting body from the housing and from the upper supporting body and pulling the lower supporting body away laterally or axially. After the two bearings have been dismantled, the upper supporting body is lowered. The rotor can now be drawn out from the machine housing, and because of the position of the horizontal parting place between the lower and upper supporting bodies, the lowered supporting body does not obstruct the rotor.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
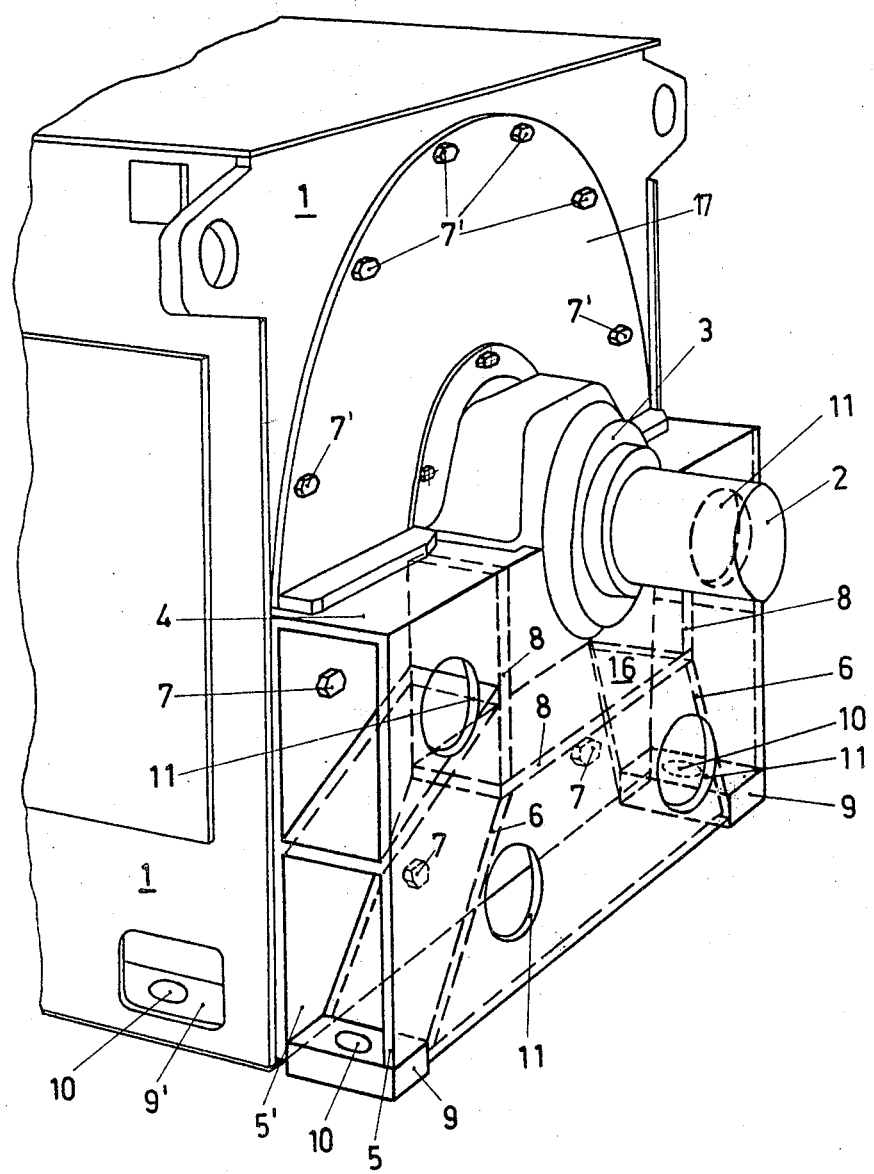
FIG. 1 shows a perspective view of a bearing support arrangement according to the present invention.

According to FIG. 1, reference number 1 denotes a stator housing of an electrical machine, the rotor shaft 2 of which is mounted in bearings 3. Bearing 3 is located on a bearing support arrangement 4 which is made double-walled and box-like and which is provided with reinforcements 6 located between the two walls 5, 5' forming the box. Bearing support arrangements 4 are fastened by means of screws 7 to the end faces of the stator housing 1 and are designed so that they extend approximately up to the axial center plane of the rotor shaft 2. The upper half of the end faces of the housing 1 is closed by a cover 17 extending down to the top side of the bearing support arrangement 4, cover 17 being screwed to the stator housing 1 by means of screws 7'.

Supports 8 connected to the reinforcements 6 are provided in the bearing support arrangement 4 for the bearing 3, the reinforcements 6 being designed, together with the supports 8, so that an oil sump 16 for supplying lubricant to the bearing 3 is formed. Located on the underside of the bearing support arrangement 4 are base rails 9 which lie in the same plane as the base rails 9' of the stator housing 1, as a result of which a special base plate is not required for the machine. In the base rails 9, 9', screw holes 10 are provided for fastening the machine to the foundation. The front plate of the bearing support arrangement 4 is provided with assembly orifices 11 in order to screw the bearing support arrangement 4 to the stator housing 1 by means of suitable tools.

Figure 2:
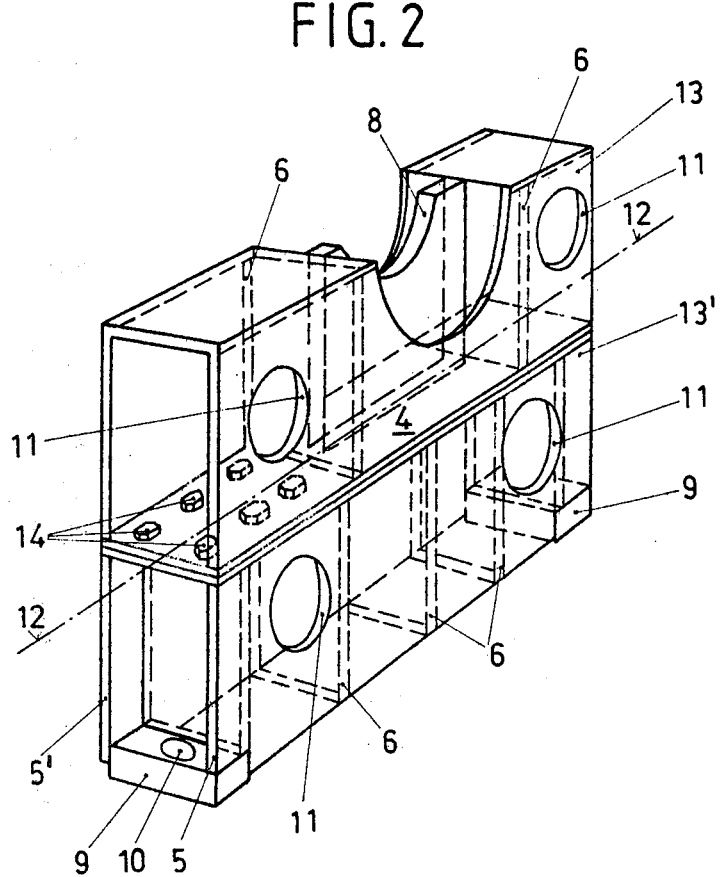
FIG. 2 shows a perspective view of a bearing support arrangement divided in a horizontal plane.

In the embodiment shown in FIG. 2, bearing support arrangement 4 is subdivided along a horizontal plane 12 into two supporting bodies 13, 13' which are connected to one another by means of screw connections 14. In this design, after releasing the screw connections 14 and the screws (not shown) on the stator housing 1, and the foundation fastenings, the lower supporting body 13' can be pulled out either laterally or forwards in the axial direction, after which the upper supporting body 13 is lowered after dismantling of the bearings 3, and the rotor can be drawn out from the stator housing 1.

Figure 3:
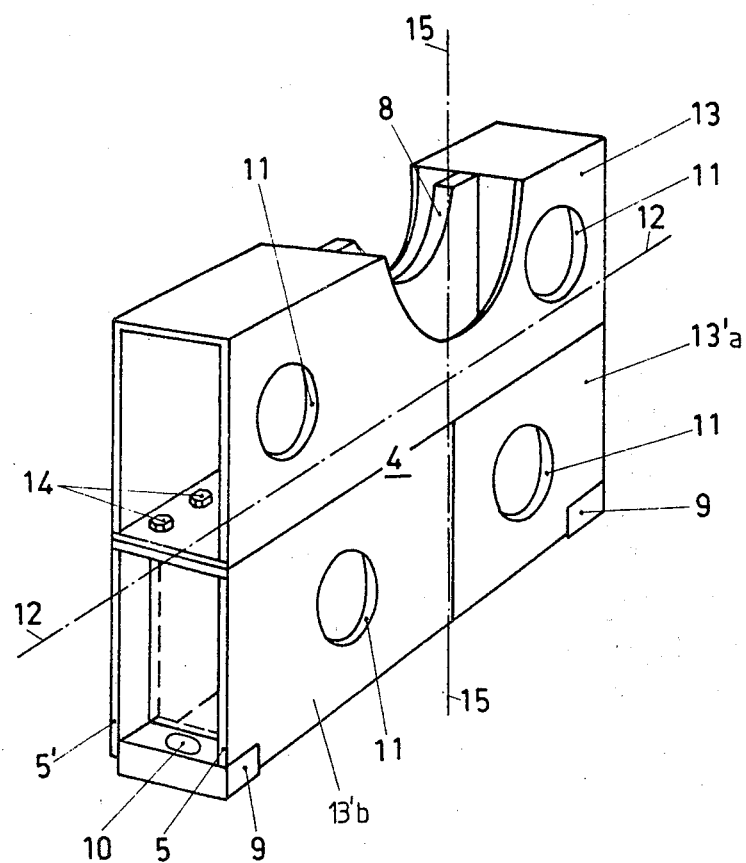
FIG. 3 shows a perspective view of a bearing support arrangement according to FIG. 2, with the lower supporting body subdivided in a vertical plane.
Figure 4:
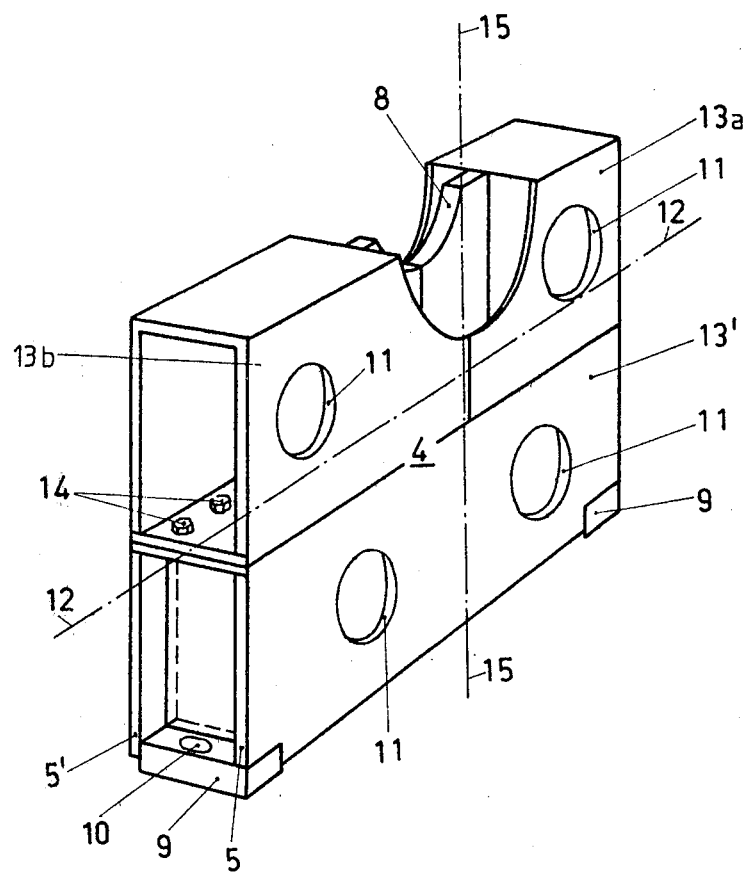
FIG. 4 shows a perspective view of a bearing support arrangement according to FIG. 2, with the upper supporting body subdivided in a vertical plane.

Further possible designs of the bearing support arrangement 4 according to the invention are evident in FIGS. 3 and 4, these designs being suitable for especially confined space conditions at the place of erection of the machine.

Thus, according to FIG. 3, the lower supporting body 13' and, according to FIG. 4, the upper supporting body 13 of the bearing support arrangement 4 subdivided in the horizontal plane 12 are divided once more in the vertical plane 15. Supporting body parts 13a, 13b; 13'a, 13'b formed from the supporting bodies 13, 13' as a result of the division in the vertical plane 15 are likewise screwed to one another via screw connections (not shown), specifically in such a way that these connections can easily be reached through the assembly orifices 11. Further subdivisions of this kind in the bearing support arrangement 4 subdivided in the horizontal plane 12 make it significantly easier to assemble and dismantle the electrical machine, especially when inspections of the bearings are necessary or when these are exchanged.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electrical machine of a horizontal design comprising:
   (a) a stator;
   (b) a housing in which said stator is mounted, said housing having end faces and a first base for supporting the weight of said housing and said stator;
   (c) a rotor;
   (d) a bearing support means at each end of said housing:
      (i) having integrated bearings therein which journal said rotor;
      (ii) which are releasably connected to the end faces of said housing;
      (iii) which extend upwardly approximately to the axial center plane of said rotor;
      (iv) which extend downwardly to a second base for supporting the weight of said bearing support means and said rotor; and
      (v) which are formed in a double-walled, box-like manner including an outer first wall and an inner second wall; and
   (e) cover members for closing the end faces of said housing above said bearing support means.

2. An electrical machine according to claim 1, wherein said bearing support means is subdivided, at least on one side of the machine, into a lower supporting body and an upper supporting body.

3. An electrical machine according to claim 2, wherein said lower supporting body is subdivided into a left-hand lower supporting body part and a right-hand lower supporting body part.

4. An electrical machine according to claim 2 or claim 3, wherein said upper supporting body is subdivided into a left-hand upper supporting body part and a right-hand upper supporting body part.

5. An electrical machine according to claim 1, wherein said outer first wall has assembly orifices therein which provide access to said inner second wall for attaching said bearing support means to said housing.

6. An electrical machine according to claim 1 or claim 2, and further comprising an oil sump disposed underneath said bearings.

7. An electrical machine according to claim 2, wherein the horizontal parting plane between said lower and upper supporting bodies lies beneath the lower edge of said rotor.

8. An electrical machine according to claim 8 and further comprising at least one reinforcing rib located between said first and second walls.

* * * * *